July 28, 1931. L. H. CHURCH 1,816,668
CABLE CONNECTER
Filed Dec. 27, 1926
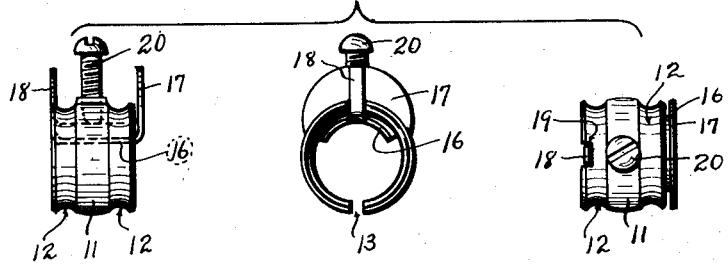
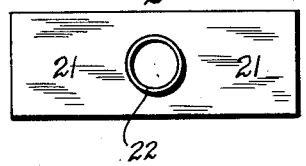
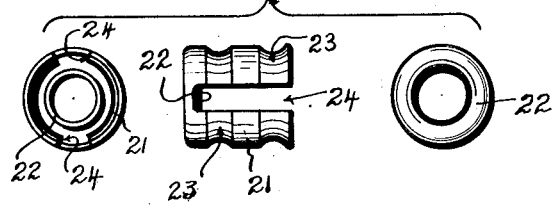
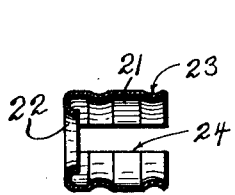
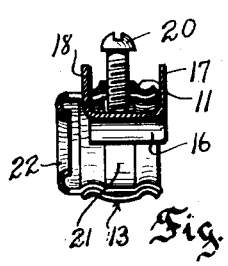
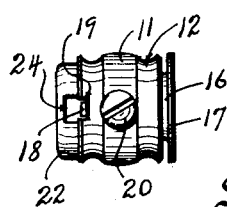
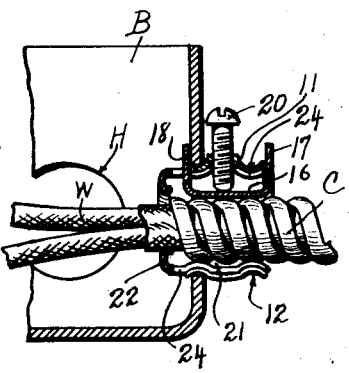
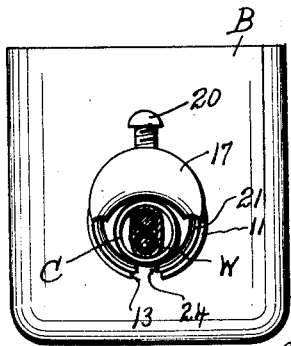
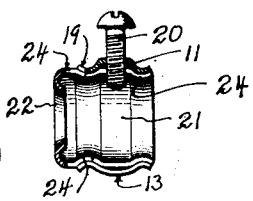
INVENTOR
Lewis H. Church
BY
Bohlen & Ledbetter
ATTORNEYS Patented July 28, 1931

1,816,668

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed December 27, 1926. Serial No. 157,013.

This invention relates to bushings for cable connecters and more particularly to bushings for use in connection with connecters capable of universally anchoring all sizes, shapes and kinds of cable to electric outlet boxes.

An object of the invention is to produce a quick detachable bushing for cable connecters so that a connecter ordinarily intended for use with soft or fiber armored cable can also be used with metal armored cable simply by attaching the bushing to the connecter.

Another object is to produce a bushing which can be readily used with a connecter of the adapter type, i. e. with a connecter of novel design which takes all sizes and shapes of cable and takes soft fiber armored or metal armored cable and which closes that part of the sleeve connecter and box hole not occupied by the cable.

Accordingly a bushing is so constructed and arranged as to be snapped within a connecter member say of the sleeve type to engage substantially the entire length thereof so as to act as a stop for the ragged sharp end of a severed metal armored cable as well as to guide the wires and protect their insulation from abrasion by the sharp cable end. More specifically, a full fashioned, unmutilated circular bushing is carried with an expansible sleeve complimentary to the interior surface of a cable connecter sleeve member and adapted to be snapped within the sleeve when a metal armored cable is to be attached to a box.

A further object is to produce a bushing including a sleeve extending therefrom, the sleeve being provided with longitudinal slots through which the operating means of a connecter, say the screw thereof, may freely move to engage a cable or adapter within the connecter, the slots serving the further purpose of weakening the sleeve so it will compress and snap into the connecter and thereby mount the bushing at one end of the connecter.

A still further object is to produce a bushing including a supporting sleeve therefor which is suitable in size and length to engage the full length inside of a connecter sleeve and to simultaneously anchor against both box hole anchorage grooves or means included at each end of the connecter sleeve.

Another object is the provision of an adapting or adapter connecter including a cable clamp plate having means to guide the movement of the clamp plate in relation to and in or on the connecter to maintain the necessary working relation or alignment between a clamp plate and operating screw means without obstruction by the detachable bushing. To this end an ear formed on the cable clamp plate is adapted to reciprocate in a notch in the connecter and also reciprocate freely through one of the weakening slots of the bushing, the adapter clamp plate being disposed within the snap-in sleeve for engagement with the cable.

These and other objects of the invention and the means for their attainment will be more apparent from the following detailed description of the accompanying drawings illustrating embodiments and examples of the invention, in which:

Figure 1 represents view in side, and end elevation, and a plan of one type of adapter cable connecter to which the improved bushing is applicable.

Figures 2, 3 and 4 are views of the bushing separate from the connecter.

Figure 2 is a plan view of an example of a blank from which the detachable bushing may be formed.

Figure 3 shows views of the completed bushing looking from the outer or split end, from the side, and from the inner or bushing end.

Figure 4 shows a bushing in lengthwise section.

Figure 5 is a longitudinal sectional view showing a bushing mounted in an adapter connecter.

Figure 6 is a plan view of the bushing mounted in an adapter.

Figure 7 is a box assembly view, showing the bushing in a connecter attaching metal armored cable to a box.

Figure 8 is an outside end view of the box assembly.

Figure 9 is a view similar to Figure 5 but with the adapter omitted to show the application of the improved bushing to a connecter in which a screw constitutes one element of the cable clamping means. In other words, this view shows the bushing snapped into an ordinary sleeve connecter.

Electric outlet boxes B are manufactured with knockout openings or holes H to receive either soft or armored cable C secured therein by cable connecters and the insulation covered wires W are manipulated inside the box to make electrical connections in the usual way.

An adapter connecter, with which my novel bushing may be used, is illustrated in Figures 1, 2 and 3 as comprising a connecter member 11, usually a sleeve formed from a resilient metal plate or stamping, which is rolled into shape with box hole anchorage means such as a groove or grooves 12 proximate one or both ends of the sleeve. Opposite edges of the sleeve forming stamping come together to form a longitudinal split 13 which permits the connecter member 11 to be contracted, for insertion within the box hole H. The box hole edge H is engaged upon expansion of the connecter member 11 within one of the grooves 12 to effect anchorage of the connecter member in a box hole.

While a sleeve type connecter member 11 is shown other forms of construction may be used in the part 11 to carry the movable parts of the connecter. It is noted that either end 12 may be anchored in a box hole, and that the connecter member is reversible in respect to fitting of either end in the box.

The connecter member 11 is adapted to receive a cable C, either a metal armored cable or a soft cable. Frequently it is necessary to secure small size cable C in a standard size or large box hole H. The open space through the connector sleeve leading into the box not occupied by the cable should be closed to prevent the entrance of dirt and plaster into the outlet box, and the connecter performs these purposes with or without the bushing.

Within or upon the connecter is mounted an adapter element comprising a cable clamp plate 16 formed from a plate or stamping whereof one end 17 may be substantially circular to form a shutter or closure 17 for the box hole and sleeve 11 to retain the clamp plate 16 in alignment with operating means, such as a screw 20. To prevent rotation of the adapter 16—17 in the sleeve 11 about the axis of the cable C, a guide tongue 18 is carried with the clamp plate 16 and is adapted to reciprocate in a notch 19 in the connecter member to guide the clamp plate 16 in its lateral or radial movement in the connecter and to hold it in line with the screw. The screw forces the clamp plate 16 toward the cable C to clamp it in the connecter, and expands the connecter sleeve 11 to anchor it within the box hole H, and holds the shutter 17 in closed position over the box hole.

It is necessary in some instances to attach metal armored cable C to the box B, while in other instances, fibre covered or what may be termed soft cable must be secured to the box. When armored cable is used, the sharp jagged metal armored cable end must not project into the box B and the insulation covered wires must be protected from cuts or abrasions. The invention therefore seeks to provide a quick detachable bushing which may or may not be used with the connecter as circumstances demand. In other words, the mechanic on the job is to be provided with one standard form of connecter which may be used with all varieties of cable and the bushing is not used if soft cable is to be installed in the box B.

An example of the improved detachable bushing is separately shown in Figures 2 through 4. The bushing is formed from a stamping such as is illustrated in Figure 2 and preferably of resilient metal with a centrally disposed aperture defined by a ring or flange 22 which is the bushing. The stamping is then pressed to form a sleeve 21 with spaced snap-in grooves 23 at or near each end so that the exterior of the bushing sleeve 21 will conform to the interior surface of the connecter sleeve 11. The sides of the sleeve forming plates 21 come together to form opposite longitudinal weakening slots 24 which permit contraction of the sleeve for insertion within the connecter sleeve 11, the apertured end 22 serving as the bushing for the connecter sleeve 11.

The snap-in bushing sleeve 21 thus formed may be contracted and pushed into the sleeve 11 until the bushing groves 23 snap onto the inner surface of the connecter sleeve anchorage grooves 12 because the sleeve 21 is split as at 24 to permit sleeve contraction and expansion. As the bushing sleeve 21 is telescoped or is slid into the connecter sleeve 11, the bushing sleeve yields or contracts to permit its grooves 23 to engage the similar grooves. The engagement of these two grooves 12 and 23, especially at each end of the two sleeves, firmly holds the bushing in the connecter.

The bushing sleeve slots 24 are comparatively wide and one of them is disposed in register with the screw 20 in the connecter member and also in register with the notch 19 so that the screw 20 and tongue 18 may freely operate therethrough. The bushing sleeve 21 is inserted between the clamp plate 16 and connecter sleeve 11 and thus the tongue 18 also passes through the slot 24 in its reciprocation in the notch 19. After the cable C is inserted and the screw 20 run down against the clamp plate 16 or cable C, the bushing snap sleeve 21 is firmly clamped against connecter sleeve 11 and firmly retained in place, although the engagement of the bushing groove 23 with the connecter groove 12 is sufficient to hold the bushing in the connecter. The bushing does not interfere in any way with the operation of the adapter 16—17 or movement of the screw 20.

Figure 9 illustrates how the bushing may be used with a plain ordinary connecter. The adapter element 16—17 is omitted from the bushing which may be done if extra large cable is being used. The mechanic simply bends the adapter guide tongue 18 out of the notch 19 and casts aside the adapter clamp plate. It is observed how the full length bushing sleeve 21 establishes a hold inside the connecter sleeve 11 to thereby mount the bushing on the connecter end. Both sleeves, i. e. the connecter and bushing dilate or expand under force of the screw bearing against the cable to render effective the box hole anchorage means 12 to anchor the connecter in the box hole.

It will thus be seen that a snap-in bushing has been provided which is applicable alike to connecters whether of the adapter type as in Figure 1 or of the ordinary type as in Figure 9. The snap-in sleeve 21 of the bushing has sufficient bearing against the interior of the connecter sleeve 11 to firmly retain the same in position and the bushing can be slipped into the connecter from either end of said connecter as noted in Figure 9. Thus one form of connecter is made useful for metal armored or cable not metal armored as the case may be, and the bushing may be cast aside when not needed.

The improved bushing 22 has the advantage of being full fashioned, that is to say, its ring is smooth and continuous and it forms a solid closure at the sleeve end after the cable C and wires W are in place. The fact that the bushing and connecter simply telescope one in the other makes the operation of attaching or detaching the bushing a simple one.

The opening or openings 24, i. e., slots 24, through the bushing sleeve 21 permits free and unobstructed movement of any kind of operating means therethrough. The screw 20 shown is a typical type of operating means and functions as a cable clamp to secure the cable in the connecter and in the box when there is not present an adapter clamp plate which is the case in Figure 9.

Thus without the cable clamp 16, the screw 20 becomes, itself, for all practical purposes, a cable clamp means, but when the clamp plate 16 is used, the screw then constitutes operating means forming a part only of the cable clamp means. In other words, the screw 20 together with cable clamp plate 16 form clamp means 20—16 to grip a cable in the connecter and box.

What is claimed is:

A connecter comprising a longitudinally split expansible connecter sleeve having box hole edge anchorage grooves and a notch, a cable clamp plate carried movably within the sleeve including a shutter at one end to close the sleeve and a guide tongue at the other end slidable in the notch, a screw threaded thru the sleeve to operate the clamp plate, and a separable bushing including an expansible slotted sleeve formed with grooves engaging the connecter sleeve from end to end, and the aforesaid screw and tongue movably operating thru one of the slots in the bushing sleeve.

In testimony whereof, I affix by signature.

LEWIS H. CHURCH.